though these amines are known in the art. These nitriles may be prepared by the cyanoethylation of an alcohol with an alpha-beta unsaturated nitrile in the presence of a basic catalyst. The β-hydrocarbyloxypropionitriles are desirably purified by conventional methods after their preparation. However, admirable yields of 3-hydrocarbyloxypropylamines may be obtained through the instant novel process by direct hydrogenation of the crude cyanoethylation product of the aforesaid preparative reaction. In any case, care should be taken to insure that the water content in the reactor is maintained within those limits herein set forth.

United States Patent Office 3,253,040
Patented May 24, 1966

3,253,040
PROCESS FOR THE PRODUCTION OF PRIMARY 3-HYDROCARBYLOXYPROPYLAMINES
George H. Potter, St. Albans, and Richard C. Myerly, South Charleston, W. Va., assignors to Union Carbide Corporation, a corporation of New York
No Drawing. Filed Dec. 10, 1962, Ser. No. 243,579
5 Claims. (Cl. 260—584)

This invention relates to a process for the preparation of amines. In particular, the invention is directed to a novel process for the production of a primary 3-hydrocarbyloxypropylamine by hydrogenation of a β-hydrocarbyloxypropionitrile.

Heretofore, processes for the production of primary 3-hydrocarbyloxyamines by hydrogenation of the corresponding nitrile have resulted in the production of large amounts of the secondary amine. In an effort to minimize this undesired by-product, prior art processes have resorted to adding ammonia to the nitrile feed, since the presence of this compound suppresses the formation of the secondary amine. This addition of ammonia results in obvious disadvantages of expense as well as drawbacks which accrue from the toxicity of the compound, and the special handling required when the compound is used. In addition, it has been previously regarded as necessary to conduct the hydrogenation process at relatively high pressures, e.g., in the range of from about 40 to 70 atmospheres and higher, in order to obtain high yields of primary amine. Thus, prior art processes have suffered from the disadvantage and expense which accrue from the use of ammonia and the need for high pressures.

It has now been unexpectedly discovered that these disadvantages may be eliminated by controlling the amount of the water in the process. By the novel process of this invention primary amines are obtained in surprisingly good yields in the absence of ammonia and at pressures well below those employed by the art. The novel process involves conducting the hydrogenation in the presence of less than about 1.0 percent water by weight based on the nitrile feed. Thus by the novel process the hydrogenation reaction can be successfully steered toward production of primary amine without observance of bothersome and expensive conditions heretofore considered critical.

It is therefore an object of this invention to provide a novel process for the production of 3-hydrocarbyloxypropylamines. It is another object of this invention to provide such a novel process which does not result in large amounts of the secondary amine as by-product. It is another object of the invention to provide such a novel process which does not involve the addition of ammonia. It is still another object of the invention to provide such a novel process which obviates the need for high pressure equipment. Still other objects of the instant invention will become obvious in view of the ensuing specification and claims.

One or more of the aforesaid objects may be achieved by the novel process of the instant invention which comprises contacting a β-hydrocarbyloxypropionitrile with hydrogen in the presence of a metal hydrogenation catalyst, and in the presence of less than 1.0 percent by weight water based on the weight of the nitrile, and under a hydrogen pressure of 75 to 250 p.s.i.g. The process may be illustrated by the following equation:

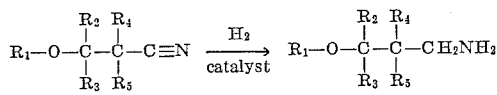

wherein $R_1$ is a monovalent hydrocarbyl radical and $R_2$, $R_3$, $R_4$, and $R_5$ are either hydrogen or a monovalent hydrocarbyl radical. By the term "hydrocarbyl" as used above and as used in the term "hydrocarbyloxy" is meant a monovalent radical free from ethylenic and acetylenic unsaturation such as alkyl, cycloalkyl and aromatic radicals. More specifically these radicals include alkyl, aryl, alkaryl, aralkyl, cycloalkyl and alkylcycloalkyl. Illustrative of such radicals are methyl, ethyl, n-propyl, isopropyl, n-butyl, isobutyl, 2-ethylbutyl, n-pentyl, 2-methylpentyl, n-hexyl, 2-ethylhexyl, n-heptyl, n-octyl, nonyl, decyl, tridecyl, tetradecyl, octadecyl, phenyl, tolyl, xylyl, mesityl, benzyl, naphthyl, cyclopropyl, cyclopentyl, cyclohexyl, methylcyclohexyl, and the like.

The β-hydrocarbyloxypropionitriles which are hydrogenated by this novel process are known in the art. These nitriles may be prepared by the cyanoethylation of an alcohol with an alpha-beta unsaturated nitrile in the presence of a basic catalyst. The β-hydrocarbyloxypropionitriles are desirably purified by conventional methods after their preparation. However, admirable yields of 3-hydrocarbyloxypropylamines may be obtained through the instant novel process by direct hydrogenation of the crude cyanoethylation product of the aforesaid preparative reaction. In any case, care should be taken to insure that the water content in the reactor is maintained within those limits herein set forth.

The nitriles which are contemplated as reactants in the instant novel process are those which have a hydrocarbyloxy-radical monovalently bonded to the carbon atom which is beta to the nitrile group. Illustrative nitriles hereinbefore characterized with respect to Equation I are, β-methoxypropionitrile,
β-ethoxypropionitrile,
β-propoxypropionitrile,
β-isopropoxypropionitrile,
β-butoxypropionitrile,
β-isobutoxypropionitrile,
β-(2-ethylbutoxy)propionitrile,
β-pentoxypropionitrile,
β-(2-methylpentoxy)propionitrile,
β-hexoxypropionitrile,
β-(2-ethylhexoxy)propionitrile,
β-heptoxypropionitrile,
β-decoxypropionitrile,
β-tridecoxypropionitrile,
β-octadecoxypropionitrile,
β-phenoxypropionitrile,
β-benzoxypropionitrile,
β-tolyloxypropionitrile,
β-naphthyloxypropionitrile,
β-xylyoxypropionitrile,
β-mesityloxypropionitrile,
β-cyclopropyloxypropionitrile,
β-cyclohexoxypropionitrile,
β-methylcyclohexoxypropionitrile, and the like. Preferred reactants are the β-alkoxypropionitriles; eminently preferred are β-alkoxypropionitriles containing 1 to 18 carbon atoms in the said alkoxy group.

The novel process of this invention involves the catalytic hydrogenation of the above nitriles in the presence of a metal hydrogenation catalyst. Such metal hydrogenation catalysts are well known in the art. Materials useful as catalysts in promoting the hydrogenation of the nitriles include metals such as nickel, cobalt, copper, platinum and palladium. Nickel catalysts were found to be most suitable. Illustrative catalysts include nickel, Raney nickel, supported nickel and supported nickel containing catalysts. For example, supported nickel catalysts include among others, nickel on kieselguhr, nickel on fullers earth, nickel on clay and the like. Other catalysts such as cobalt on kieselguhr, palladium on carbon, and platinum on carbon can be used. The catalyst may also be employed in finely divided form, or dispersed on other carriers such as silica gel, zeolites and the like.

The catalyst is employed in catalytically significant quantities. In general, a catalyst concentration in the range of from about 1.0 and lower to about 10.0 and higher, weight percent, based on weight of the nitrile, is suitable. For optimum results, the particular catalyst employed, the nature of the nitrile reactant, the operative conditions and other factors will largely determine the catalyst concentration. A catalyst concentration of from about 2 to about 5 percent by weight is preferred. When using Raney nickel, a catalyst concentration in the range of 2 to 4 weight percent is optimum.

In accordance with the novel process of this invention, high yields of primary amine are readily obtainable, without the need for ammonia as a suppressant for the secondary amines, by maintaining the water content in the reaction at less than 1.0 percent by weight based on the nitrile. It is generally preferred to have some water present, and therefore it is eminently suitable to conduct the hydrogenation reaction in the presence of from 0.01 to about 1.0 percent water by weight, on the same basis.

The instant process is conducted under pressure of hydrogen gas. Although the novel process of this invention enables the hydrogenation to be conducted at pressures lower than heretofore possible, operating pressure does not critically effect the process. Pressures as low as 50 p.s.i.g. and as high as 1000 p.s.i.g. are operable and do not adversely effect the yield. Throughout the pressure range high yields of primary amine are obtained without the need for ammonia as a suppressor of the secondary amines To realize the full advantages afforded by this novel process, however, it is preferred to operate in the range of from about 75 p.s.i.g. to about 250 p.s.i.g. It is highly preferred to use pressures of from about 125 p.s.i.g. to about 175 p.s.i.g.

The hydrogenation reaction is conducted at moderately elevated temperatures. Depending on various factors such as the nature of the nitrile reactant, the particular catalyst employed, the catalyst concentration and the like, the reaction temperature may vary from about 75° C. to about 175° C. Lower temperatures, although operable will result in poor conversions, whereas higher temperatures tend to increase by-product formation. It is preferred to operate at a temperature of from about 90° C. to about 150° C.

The presence of an organic solvent or diluent which is inert to the nitrile will not obstruct the hydrogenation reaction in the novel process. However, in practice, the addition of such a solvent is not preferred since it would tend only to decrease the productivity of the reaction. It is pointed out, nonetheless, that when a crude nitrile is employed as reactant, there is present a small amount of the corresponding alcohol from which the alkoxy group was derived, usually about 1.0 to 10.0 percent by weight based on the nitrile. Although this may be considered a solvent it appears to have no effect whatsoever on the efficiency or yield of the hydrogenation reaction.

The novel process of this invention is carried out in the liquid phase under a pressurized hydrogen atmosphere. The novel process may be effected in an autoclave or similar reactor. It is preferred that the reactor be supplied with an agitating means to thoroughly mix the reactants during the hydrogenation reaction.

In general, reaction time will vary depending upon the nitrile reactant the catalyst and the concentration thereof. The reaction is allowed to proceed until the absorption of hydrogen ceases. The reaction time will generally vary from about 2 to about 12 hours.

The novel process is characterized by high yields of primary amine. Unreacted nitrile and any by-product secondary amine can be recovered by conventional techniques, e.g., distillation.

The β-alkoxypropylamines of this invention are useful as epoxy curing agents and as gasoline additives. Higher molecular weight amines are particularly useful in gasoline as anti-rumble agents.

The following examples are illustrative.

*Example I*

A. To a one-gallon stainless steel stirred autoclave there was added 1000 grams of β-methoxypropionitrile and 40 grams of Raney nickel catalyst (wet basis, washed three times with equal volumes of methanol). The water content of the material charged to the autoclave was 0.26 percent by weight. The autoclave was then closed, purged once with hydrogen and heated to 110° C. Hydrogen was then added until a pressure of 150 p.s.i.g. was obtained in the reactor, and the reactor was held at this pressure and at a temperature of 110° C. until the absorption of hydrogen ceased. The time required for the hydrogenation reaction was four hours. After the absorption of hydrogen ceased, the reactor was cooled, vented, discharged and washed with 300 cc. of methanol. The resulting product mixture was then filtered and purified by fractional distillation. 3-methoxypropylamine was collected at a vapor temperature of 117–118° C. at atmospheric pressure. The purity was 98.9 percent as determined by titration with perchloric acid in acetic acid using crystal violet as the indicator. The yield and efficiency to 3-methoxypropylamine was 83.8 percent. Bis(3-methoxypropyl)amine was collected at a vapor temperature of 90–92° C. at 10 mm. Hg pressure. The purity of the secondary amine was 100 percent determined by titration, as above. The yield and efficiency were 10.4 percent.

B. In an analogous manner as above, β-methoxypropionitrile was hydrogenated at 110° C. and 150 p.s.i.g. The water content of the material charged was 1.26 percent. Approximately 21.4 percent of the nitrile was reacted, however no 3-methoxypropylamine was obtained in the resulting product mixture.

C. In an analogous manner to A above, β-methoxypropionitrile was hydrogenated at 110° C. and 1000 p.s.i.g. The water content of the charged material was 0.26 percent. Separation and analysis of the product mixture resulted in a 79.3 percent yield of 3-methoxypropylamine and a 15.6 percent yield of bis(3-methoxypropylamine).

*Example II*

To a 3-liter stainless steel autoclave was added 1000 grams of neutralized crude β-amyloxypropionitrile (derived from a mixture of primary amyl alcohols resulting from the hydroformylation of isomeric butenes) which had been stripped to remove excess amyl alcohol, and 40 grams of Raney nickel catalyst (wet basic, washed three times with isopropanol). The water content of the material charged to the autoclave was 0.43 percent. The hydrogenation and product refining were conducted as in Example I. The 3-amyloxypropylamine having a purity of 100 percent was collected at a vapor temperature of 109–110° C. at 50 mm. Hg pressure. The yield based upon contained nitrile was 68.9 percent.

*Example III*

To a 3-liter stainess steel autoclave was added 1000 grams of neutralized cured β-(2-ethylhexyloxy)propionitrile and 30 grams of Raney nickel catalyst (wet basis, washed three times with acetone). The water content of the material charged to the autoclave was 0.30 percent. The hydrogenation and product refining were conducted as in Example I. The 3(2-ethylhexyloxy)propylamine having a purity of 99.1 percent was collected at a vapor temperature of 109°–111° C. at 10 mm. Hg pressure. The yield, based upon contained nitrile, was 82.3 percent.

*Example IV*

3-isodecyloxypropylamine was prepared from β-(isodecyloxy)propionitrile (derived from a mixture of primary decyl alcohols resulting from the hydroformylation of isomeric nonenes made by trimerization of propylene) using a procedure similar to that in Example III. The water content of the material charged to the autoclave was 0.26 percent. The 3-isodecyloxypropylamine having a purity of 98.3 percent was collected at a vapor temperature of 137–140.5° C. at 10 mm. Hg pressure. The yield, based upon contained nitrile, was 86.4 percent.

*Example V*

3-tridecyloxypropylamine was prepared from β-(tridecyloxy)propionitrile using a procedure similar to that in Example III. The water content of the material charged to the autoclave was 0.26 percent. The 3-tridecyloxypropyl amine having a purity of 100 percent was collected at a vapor temperature of 115–124° C. at 1 mm. Hg pressure. The yield based upon contained nitrile was 62.3 percent.

What is claimed is:

1. In a process for the production of primary 3-hydrocarbyloxypropylamines by hydrogenation of β-hydrocarbyloxypropionitriles, in the presence of a hydrogenation catalyst wherein said hydrocarbyloxy group represents a monovalent radical free from ethylenic and acetylenic unsaturation, the improvement of conducting said hydrogenation in an ammonia-free atmosphere under a hydrogen pressure of from about 75 to about 250 pounds per square inch gauge while maintaining the water content of said nitrile and said hydrogenation catalyst throughout said hydrogenation below about 1.0 percent by weight based on the said nitrile.

2. In a process for the production of primary 3-hydrocarbyloxypropylamines by hydrogenation of β-hydrocarbyloxypropionitriles in the presence of a hydrogenation catalyst wherein said hydrocarboxyloxy group represents a monovalent radical free from ethylenic and acetylenic unsaturation, the improvement of conducting said hydrogenation in an ammonia-free atmosphere under a hydrogen pressure of from about 125 to about 175 pounds per square inch gauge while maintaining the water content of said nitrile and said hydrogenation catalyst throughout said hydrogenation below about 1.0 percent by weight based on the said nitrile.

3. In a process for the production of a primary 3-alkoxypropylamine by the hydrogenation of β-alkoxypropionitrile in the presence of a hydrogenation catalyst, the improvement of conducting said hydrogenation in an ammonia-free atmosphere under a hydrogen pressure of from about 125 to about 175 pounds per square inch gauge, while maintaining the water content of said nitrile and said hydrogenation catalyst throughout said hydrogenation below about 1.0 percent by weight based on the said nitrile.

4. In a process for the production of a primary 3-alkoxypropylamine by hydrogenation of a β-alkoxypropionitrile, in the presence of a Raney nickel catalyst, the improvement of conducting said hydrogenation in an ammonia-free atmosphere under a hydrogen pressure of from about 125 to about 175 pounds per square inch gauge, while maintaining the water content of said nitrile and said hydrogenation catalyst throughout said hydrogenation below about 1.0 percent by weight based on the said nitrile.

5. In a process for the production of 3-methoxypropylamine by hydrogenation of a β-methoxypropionitrile in the presence of a Raney nickel catalyst, the improvement of conducting said hydrogenation in an ammonia-free atmosphere under a hydrogen pressure of from about 125 to about 175 pounds per square inch gauge, while maintaining the water content of said nitrile and said hydrogenation catalyst throughout said hydrogenation below about 1.0 percent by weight based on the said nitrile.

References Cited by the Examiner

UNITED STATES PATENTS

| 2,165,515 | 7/1939 | Schmidt | 260—583 |
| 2,781,399 | 2/1957 | Shapiro | 260—583 |

FOREIGN PATENTS

| 544,421 | 4/1942 | Great Britain. |

CHARLES B. PARKER, *Primary Examiner.*